United States Patent
Fiore et al.

(10) Patent No.: US 10,830,078 B2
(45) Date of Patent: Nov. 10, 2020

(54) SHAFT SEAL ASSEMBLY FOR A TURBINE ENGINE

(71) Applicant: United Technologies Corporation, Farmington, CT (US)

(72) Inventors: Brad E. Fiore, Vernon, CT (US); James B. Coffin, Windsor, CT (US); Christopher M. Valva, Manchester, CT (US)

(73) Assignee: Raytheon Technologies Corporation, Farmington, CT (US)

(*) Notice: Subject to any disclaimer, the term of this patent is extended or adjusted under 35 U.S.C. 154(b) by 168 days.

(21) Appl. No.: 16/131,145

(22) Filed: Sep. 14, 2018

(65) Prior Publication Data
US 2020/0088053 A1  Mar. 19, 2020

(51) Int. Cl.
*F01D 25/18* (2006.01)
*F01D 11/00* (2006.01)
*F01D 25/16* (2006.01)

(52) U.S. Cl.
CPC ............ *F01D 11/003* (2013.01); *F01D 25/16* (2013.01); *F01D 25/183* (2013.01); *F05D 2240/55* (2013.01); *F05D 2240/60* (2013.01); *F05D 2260/98* (2013.01)

(58) Field of Classification Search
CPC .. F01D 11/003; F01D 25/183; F05D 2240/55; F05D 2240/60; F05D 2260/98; F05D 2250/182; F16C 35/073; F16C 33/4605; F16C 33/60; F16J 15/3404; F02C 7/28
USPC .......................................... 277/358, 408, 599
See application file for complete search history.

(56) References Cited

U.S. PATENT DOCUMENTS

| | | | | |
|---|---|---|---|---|
| 2,990,202 A | * | 6/1961 | Dennison | F01D 25/183 277/399 |
| 3,147,013 A | * | 9/1964 | Tracy | F16J 15/342 277/400 |
| 3,572,727 A | * | 3/1971 | Greiner | F16J 15/342 277/388 |
| 3,804,424 A | * | 4/1974 | Gardner | F16J 15/3412 277/360 |
| 3,905,605 A | * | 9/1975 | Hubner | F16J 15/3404 277/360 |
| 3,942,387 A | * | 3/1976 | Stone | B64C 27/12 74/417 |
| 4,118,997 A | * | 10/1978 | Woodward | F01D 15/12 74/417 |
| 4,277,072 A | * | 7/1981 | Forch | F16J 15/164 277/404 |
| 4,358,119 A | * | 11/1982 | Kryczun | F16J 15/36 277/369 |

(Continued)

OTHER PUBLICATIONS

EP search report for EP19185866.1 dated Dec. 2, 2019.

*Primary Examiner* — Moshe Wilensky
*Assistant Examiner* — Brian Christopher Delrue
(74) *Attorney, Agent, or Firm* — Getz Balich LLC (57) ABSTRACT

An assembly is provided for a turbine engine. This turbine engine assembly includes a tower shaft rotatable about an axis, an engine component rotatable with the tower shaft about the axis, and a seal assembly. The engine component extends axially along the axis to an end surface. The seal assembly includes a carbon seal element, where the carbon seal element circumscribes the tower shaft and axially engages the end surface.

16 Claims, 9 Drawing Sheets

(56) References Cited

U.S. PATENT DOCUMENTS

| | | | | |
|---|---|---|---|---|
| 4,406,459 A * | 9/1983 | Davis | F16J 15/3404 | 277/401 |
| 4,406,460 A * | 9/1983 | Slayton | F16J 15/164 | 277/401 |
| 4,461,487 A * | 7/1984 | Matsumoto | B63H 23/321 | 277/359 |
| 4,471,964 A * | 9/1984 | Kotzur | F16J 15/42 | 277/347 |
| 4,687,346 A * | 8/1987 | Suciu | F01D 25/164 | 277/385 |
| 4,948,151 A * | 8/1990 | Janzen | F16J 15/3468 | 277/359 |
| 4,990,054 A * | 2/1991 | Janocko | F04D 9/001 | 415/111 |
| 5,052,694 A * | 10/1991 | Lipschitz | F16J 15/342 | 277/388 |
| 5,106,105 A * | 4/1992 | Drexler | F16J 15/004 | 277/369 |
| 5,249,924 A * | 10/1993 | Brum | B64D 39/00 | 416/48 |
| 5,370,404 A * | 12/1994 | Klein | F16C 27/066 | 277/572 |
| 5,464,227 A * | 11/1995 | Olson | F16J 15/3404 | 277/400 |
| 5,622,438 A * | 4/1997 | Walsh | F01D 25/162 | 384/624 |
| 5,636,848 A * | 6/1997 | Hager | F16J 15/164 | 277/420 |
| 5,658,127 A * | 8/1997 | Bond | F01D 25/183 | 277/399 |
| 6,109,617 A * | 8/2000 | Laney | F16J 15/3484 | 277/369 |
| 6,132,168 A * | 10/2000 | Kovaleski | F01D 11/001 | 415/107 |
| 6,135,458 A * | 10/2000 | Fuse | F16J 15/342 | 277/382 |
| 6,142,729 A * | 11/2000 | Tran | F01D 11/003 | 415/113 |
| 6,196,790 B1 * | 3/2001 | Sheridan | F01D 11/003 | 415/111 |
| 6,325,175 B1 * | 12/2001 | Dittrich | F04B 39/0238 | 184/6.16 |
| 7,341,426 B2 * | 3/2008 | Schwarz | F01D 11/122 | 415/127 |
| 7,373,780 B2 * | 5/2008 | Peters | F01D 25/18 | 60/772 |
| 7,971,507 B2 * | 7/2011 | Swainson | F16H 57/0434 | 184/6.12 |
| 8,011,883 B2 * | 9/2011 | Schwarz | F01D 11/20 | 415/127 |
| 8,167,314 B2 * | 5/2012 | Ullah | F16J 15/3472 | 277/370 |
| 8,747,054 B2 * | 6/2014 | Witlicki | F01D 25/164 | 415/119 |
| 8,777,229 B2 * | 7/2014 | Davis | F01D 11/005 | 277/390 |
| 8,910,946 B2 * | 12/2014 | Meller | F16L 27/087 | 277/408 |
| 8,919,134 B2 * | 12/2014 | Tatman | F01D 11/003 | 60/796 |
| 8,967,627 B2 * | 3/2015 | Jahn | F01D 11/003 | 277/352 |
| 9,631,508 B2 * | 4/2017 | Blais | F01D 11/02 | |
| 9,726,031 B2 * | 8/2017 | Cusack | F16J 15/3284 | |
| 9,732,630 B2 * | 8/2017 | Lucas | F01D 25/183 | |
| 9,915,175 B2 * | 3/2018 | Miller | F01D 11/003 | |
| 9,970,526 B1 * | 5/2018 | Bortoli | C22C 38/06 | |
| 10,190,429 B2 * | 1/2019 | Garrison | F16J 15/441 | |
| 10,197,150 B2 * | 2/2019 | Anglin | F02C 7/32 | |
| 10,221,937 B2 * | 3/2019 | Anglin | F16H 57/0423 | |
| 10,364,880 B2 * | 7/2019 | Anglin | F16H 57/0423 | |
| 10,557,362 B2 * | 2/2020 | Correia | F01D 9/04 | |
| 10,598,020 B2 * | 3/2020 | Amador | F01D 5/066 | |
| 2006/0273196 A1 * | 12/2006 | Crooks | B05B 3/0431 | 239/242 |
| 2007/0085278 A1 * | 4/2007 | Davis | F01D 25/183 | 277/411 |
| 2008/0148881 A1 * | 6/2008 | Moniz | F02C 7/32 | 74/15.6 |
| 2008/0236951 A1 * | 10/2008 | Alecu | F01D 25/18 | 184/6.11 |
| 2010/0038174 A1 * | 2/2010 | Mordukhovich | F16H 57/0413 | 184/6.12 |
| 2010/0140019 A1 * | 6/2010 | Imai | F16H 57/0493 | 184/6.12 |
| 2011/0233871 A1 * | 9/2011 | Davis | F16J 15/3464 | 277/377 |
| 2011/0250056 A1 * | 10/2011 | Munson | F16J 15/445 | 415/170.1 |
| 2012/0043725 A1 * | 2/2012 | Jahn | F16J 15/3472 | 277/306 |
| 2012/0186270 A1 * | 7/2012 | Tatman | F01D 25/162 | 60/796 |
| 2012/0261887 A1 * | 10/2012 | Vasagar | F01D 11/003 | 277/543 |
| 2013/0034438 A1 * | 2/2013 | Jahn | F01D 11/003 | 415/230 |
| 2013/0074618 A1 * | 3/2013 | Chalmet | F02N 15/067 | 74/6 |
| 2013/0078091 A1 * | 3/2013 | Rees | F16J 15/4472 | 415/230 |
| 2014/0169941 A1 * | 6/2014 | DiBenedetto | F02K 3/06 | 415/111 |
| 2014/0294558 A1 * | 10/2014 | Haugh | F02C 7/14 | 415/1 |
| 2015/0053047 A1 * | 2/2015 | Sloan, Jr. | F02N 15/025 | 74/7 C |
| 2016/0047476 A1 * | 2/2016 | Kiernan | F16J 15/3412 | 277/306 |
| 2016/0333711 A1 * | 11/2016 | Miller | F04D 29/122 | |
| 2017/0101879 A1 * | 4/2017 | Wotzak | F01D 11/003 | |
| 2017/0114884 A1 * | 4/2017 | Altamura | F16L 27/0812 | |
| 2017/0146112 A1 * | 5/2017 | Anglin | F16H 57/0495 | |
| 2017/0314407 A1 * | 11/2017 | Garrison | F16J 15/443 | |
| 2017/0342848 A1 * | 11/2017 | Snow | F01D 25/18 | |
| 2018/0023684 A1 * | 1/2018 | Anglin | F16H 57/0421 | 74/423 |
| 2018/0045316 A1 * | 2/2018 | Kovacik | F16J 15/324 | |
| 2019/0211877 A1 * | 7/2019 | Amador | F01D 5/066 | |
| 2019/0226585 A1 * | 7/2019 | Snow | F01D 11/003 | |
| 2019/0331225 A1 * | 10/2019 | LeGros | F01D 25/183 | |

* cited by examiner

SHAFT SEAL ASSEMBLY FOR A TURBINE ENGINE

This invention was made with Government support awarded by the United States. The Government has certain rights in this invention.

BACKGROUND OF THE DISCLOSURE

1. Technical Field

This disclosure relates generally to a turbine engine and, more particularly, to an assembly for sealing an annular gap around a shaft of a turbine engine.

2. Background Information

Various seal assemblies are known in the art for gas turbine engine applications. While these known seal assemblies have various advantages, there is still a need in the art for improved seal assemblies as well as new applications to use seal assemblies in gas turbine engines.

SUMMARY OF THE DISCLOSURE

According to an aspect of the present disclosure, an assembly is provided for a turbine engine. This turbine engine assembly includes a tower shaft, an engine component and a seal assembly. The tower shaft is rotatable about an axis. The engine component is rotatable with the tower shaft about the axis. The engine component extends axially along the axis to an end surface. The seal assembly includes a carbon seal element, where the carbon seal element circumscribes the tower shaft and axially engages the end surface.

According to another aspect of the present disclosure, another assembly is provided for a turbine engine. This turbine engine assembly includes a shaft, a pinion gear, a stationary structure and a seal assembly. The shaft is rotatable about an axis. The pinion gear is mounted to the shaft. A tubular base of the pinion gear extends axially along the axis to a distal annular end surface. The stationary structure circumscribes the shaft. The seal assembly seals a gap between the stationary structure and the pinion gear. The seal assembly includes an annular seal element circumscribing the shaft and axially contacting the distal annular end surface.

According to still another aspect of the present disclosure, another assembly is provided for a turbine engine. This turbine engine assembly includes a shaft, a pinion gear, a seal runner, a stationary structure and a seal assembly. The shaft is rotatable about an axis. The pinion gear is mounted to the shaft. The seal runner is mounted to the pinion gear. The seal runner extends axially along the axis to a distal annular end surface. The stationary structure circumscribes the shaft. The seal assembly seals a gap between the stationary structure and the seal runner. The seal assembly includes an annular seal element circumscribing the shaft and axially contacting the distal annular end surface.

The turbine engine assembly may also include a rotating assembly and a coupling assembly. The rotating assembly may include a first bladed rotor, a second bladed rotor and an engine shaft that connects the first bladed rotor to the second bladed rotor. The engine shaft may be rotatable about a centerline that is angularly offset from the axis. The coupling assembly may couple the tower shaft to the rotating assembly.

The coupling assembly may be configured as or otherwise include the engine component.

The engine component may be mounted to a component of the coupling assembly.

The tower shaft may project axially into a bore of the engine component. The engine component may be mounted to the tower shaft.

The turbine engine assembly may also include a fluid permeable seal assembly and a fluid impermeable seal assembly. The fluid permeable seal assembly may be configured radially between the tower shaft and the engine component. The fluid impermeable seal assembly may be configured radially between the tower shaft and the engine component. The fluid impermeable seal assembly may be located axially between the fluid permeable seal assembly and the end surface. An aperture may extend through a tubular sidewall of the engine component and be fluidly coupled with a channel that extends axially between the fluid permeable seal assembly and the fluid impermeable seal assembly.

The fluid permeable seal assembly may include a first seal ring seated in a first groove extending axially between a pair of circumferentially interrupted flanges projecting out from a tubular sidewall of the tower shaft. The fluid impermeable seal assembly may include a second seal ring seated in a second groove extending axially between a pair of circumferentially uninterrupted flanges projecting out from the tubular sidewall of the tower shaft.

The engine component may be configured as or otherwise include a pinion gear mounted to the tower shaft.

The pinion gear may be attached to the tower shaft by a spline connection between the tower shaft and the pinion gear.

The turbine engine assembly may also include a bearing. The pinion gear may project through and radially engage an inner race of the bearing. The bearing may be axially aligned with the spline connection along the axis.

The turbine engine assembly may also include a second engine component mounted to the tower shaft. The engine component may be mounted to the second engine component. The tower shaft may project axially through a bore of the engine component.

The second engine component may be configured as or otherwise include a pinion gear. The engine component may be configured as or otherwise include a seal runner.

The pinion gear may be attached to the tower shaft by a spline connection between the tower shaft and the pinion gear. The seal runner may be attached to the pinion gear by a threaded connection between the pinion gear and the seal runner.

The engine component may include a tubular base and an annular flange. The tubular base may extend axially along the axis. The annular flange may project radially out from the tubular base and may include the end surface.

An outer peripheral portion of the annular flange may be circumferentially interrupted. In addition or alternatively, the tubular base may include a circumferentially interrupted ring portion.

The foregoing features and the operation of the invention will become more apparent in light of the following description and the accompanying drawings.

DETAILED DESCRIPTION

Figure 1:
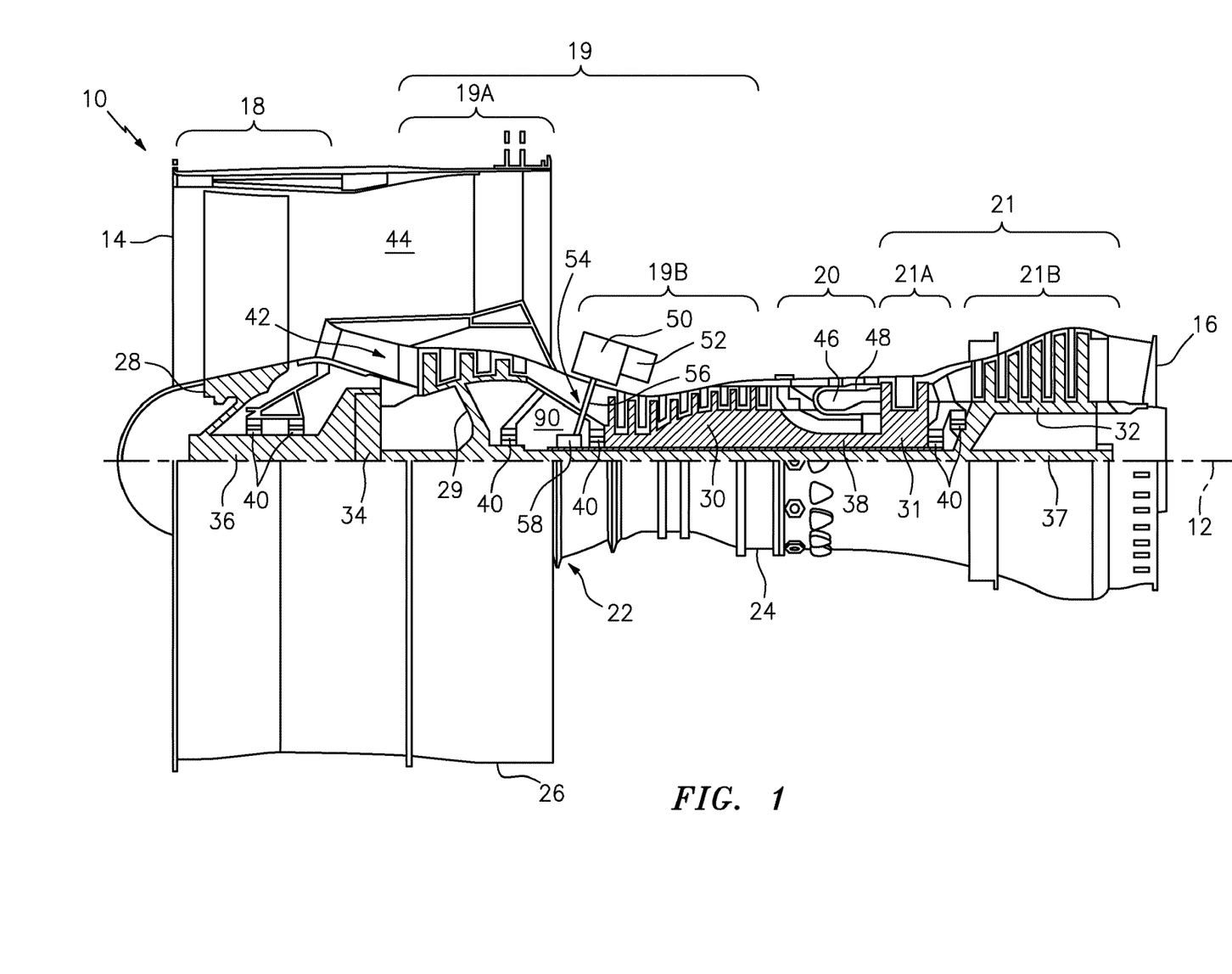
FIG. 1 is a side cutaway illustration of a geared turbine engine.

FIG. 1 is a side cutaway illustration of a geared turbine engine 10, which is configured as a turbofan engine for an aircraft propulsion system. This turbine engine 10 extends along an axial centerline 12 between an upstream airflow inlet 14 and a downstream airflow exhaust 16.

The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. This housing 22 includes an inner case 24 (e.g., a core case) and an outer case 26 (e.g., a fan case). The inner case 24 may house one or more of the engine sections 19-21; e.g., an engine core. The outer case 26 may house at least the fan section 18.

Each of the engine sections 18, 19A, 19B, 21A and 21B includes a respective bladed rotor 28-32. Each of these bladed rotors 28-32 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 28 is connected to a gear train 34, for example, through a fan shaft 36. The gear train 34 and the LPC rotor 29 are connected to and driven by the LPT rotor 32 through a low speed shaft 37. The combination of at least the LPC rotor 29, the LPT rotor 32 and low speed shaft 37 may be referred to as a "low speed spool" or a "low speed rotating assembly". The HPC rotor 30 is connected to and driven by the HPT rotor 31 through a high speed shaft 38. The combination of at least the HPC rotor 30, the HPT rotor 31 and high speed shaft 38 may be referred to as a "high speed spool" or a "high speed rotating assembly". The shafts 36-38 are rotatably supported by a plurality of bearings 40; e.g., rolling element and/or thrust bearings. Each of these bearings 40 is connected to the engine housing 22 by at least one stationary structure such as, for example, an annular support strut.

During operation, air enters the turbine engine 10 through the airflow inlet 14. This air is directed through the fan section 18 and into a core gas path 42 and a bypass gas path 44. The core gas path 42 flows sequentially through the engine sections 19-21. The air within the core gas path 42 may be referred to as "core air". The bypass gas path 44 flows through a duct between the inner case 24 and the outer case 26. The air within the bypass gas path 44 may be referred to as "bypass air".

The core air is compressed by the compressor rotors 29 and 30 and directed into a combustion chamber 46 of a combustor 48 in the combustor section 20. Fuel is injected into the combustion chamber 46 and mixed with the compressed core air to provide a fuel-air mixture. This fuel air mixture is ignited and combustion products thereof expand and flow through and sequentially cause the turbine rotors 31 and 32 to rotate. The rotation of the turbine rotors 31 and 32 respectively drive rotation of the compressor rotors 30 and 29 and, thus, compression of the air received from an inlet to the core gas path 42. The rotation of the turbine rotor 32 also drives rotation of the fan rotor 28 through the gear train 34, which propels bypass air through and out of the bypass gas path 44. The propulsion of the bypass air may account for a majority of thrust generated by the turbine engine 10, e.g., more than seventy-five percent (75%) of engine thrust. The turbine engine 10 of the present disclosure, however, is not limited to the foregoing exemplary thrust ratio or specific engine configuration.

The turbine engine 10 of FIG. 1 also includes an accessory gearbox 50, one or more gearbox attachments 52 and a transmission system 54. The accessory gearbox 50 is mounted to the inner case 24. However, in alternative embodiments, the accessory gearbox 50 may be mounted elsewhere with the turbine engine 10; e.g., to the outer case 26. The accessory gearbox 50 is configured to transfer rotational energy (e.g., torque) between the transmission system 54 and the one or more gearbox attachments 52. An example of an accessory gearbox is disclosed in U.S. Pat. No. 9,068,515 to Duong et al., which is assigned to the assignee of the present disclosure. Examples of a gearbox attachment may include an air turbine starter, a deoiler, a hydraulic pump, an oil pump, an integrated drive generator, a permanent magnet alternator and a fuel pump module. Of course, the present disclosure is not limited to including the foregoing exemplary types or configurations of the accessory gearbox 50 or the gearbox attachments 52.

Figure 2:
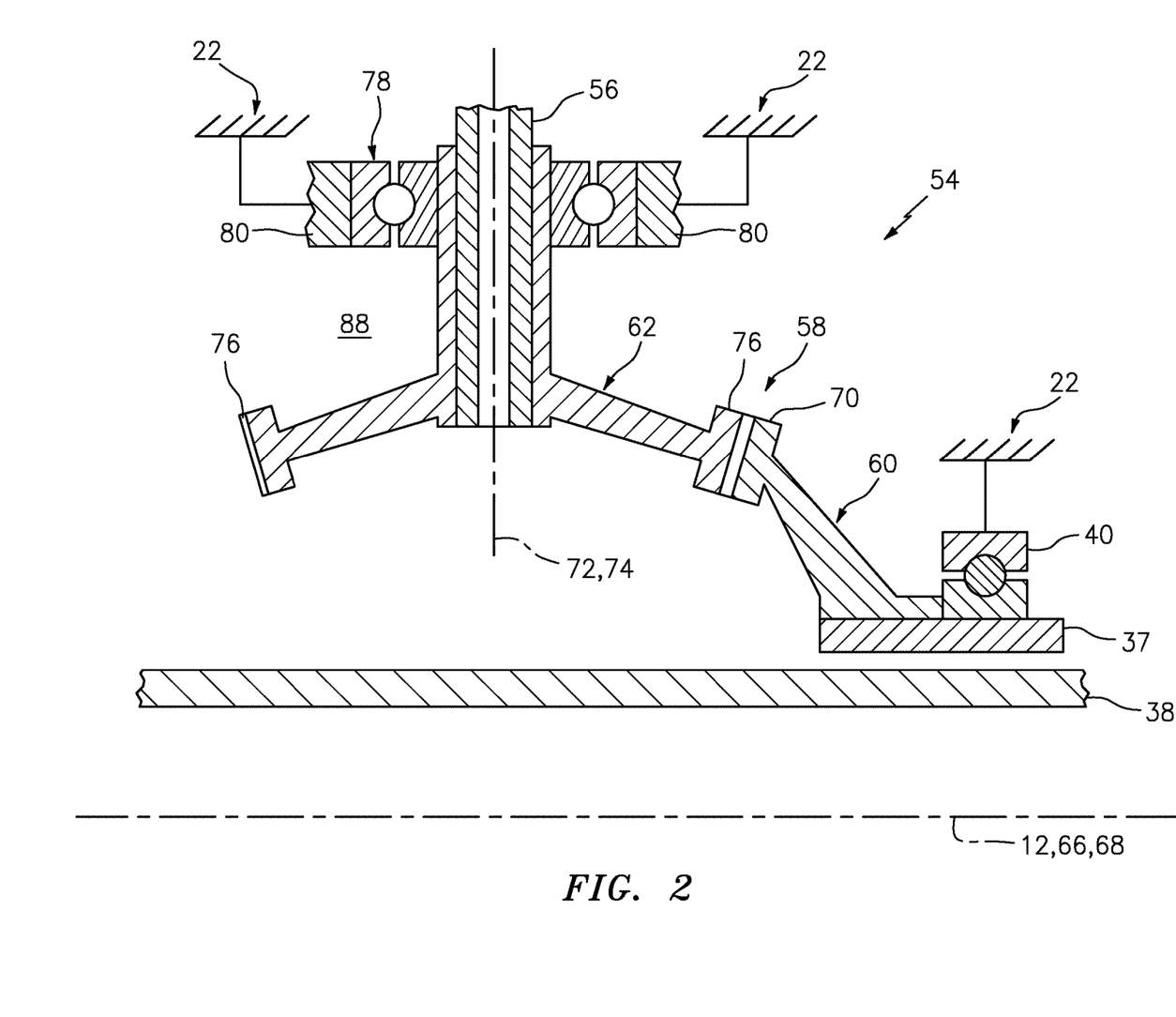
FIG. 2 is a partial side sectional schematic illustration of a portion of the turbine engine of FIG. 1.

The transmission system 54 is configured to mechanically couple and thereby transfer rotational energy (e.g., torque) between a rotating assembly (or component) of the turbine engine 10 and the accessory gearbox 50. In particular, the transmission system 54 of FIG. 1 mechanically couples one of the spools of the turbine engine 10 (e.g., the high speed spool) with the accessory gearbox 50. This transmission system 54 includes the high speed shaft 38, a tower shaft 56 and a coupling assembly such as a geared system 58. Referring to FIG. 2, the geared system 58 includes a first gear 60 and a second gear 62.

The first gear 60 of FIG. 2 is configured as a bull gear such as, for example, a bevel bull gear. This first gear 60 is mounted to the high speed shaft 38, for example, by a spline interface/connection 86 (e.g., see FIG. 3). The first gear 60 has a first rotational axis 66, which is coaxial with a rotational axis 68 of the low speed shaft 37; e.g., the centerline 12. The first gear 60 includes a plurality of first gear teeth 70. These first gear teeth 70 are arranged in a circumferential array, which extends circumferentially around the first rotational axis 66.

The second gear 62 of FIG. 2 is configured as a pinion gear such as, for example, a bevel pinion gear. This second gear 62 is mounted to the tower shaft 56, for example, by a spline interface. The second gear 62 has a second rotational axis 72, which is coaxial with a rotational axis 74 of the tower shaft 56. This second rotational axis 72 is arranged coincident with and is angularly offset from (e.g., perpendicular to) the first rotational axis 66 as well as the centerline 12. Of course, in other embodiments, the second rotational axis 72 may be arranged coincident with and acutely or obtusely angled to the first rotational axis 66. The second gear 62 includes a plurality of second gear teeth 76. These second gear teeth 76 are arranged in a circumferential array, which extends circumferentially around the second rotational axis 72.

The second gear 62 is meshed (e.g., mated and engaged) with the first gear 60. In particular, a subset of the first gear teeth 70 are mesh with a first subset of the second gear teeth 76.

The tower shaft 56 and the second gear 62 are supported by a bearing 78 (e.g., a roller (ball) bearing), which bearing 78 rotatably connects the components 56 and 62 to a stationary structure 80 (e.g., an internal structure of/for the housing 22) that circumscribes the components 56 and 62. In particular, referring to FIG. 3, a tubular base 82 of the second gear 62 projects axially along the rotational axis 72 through a bore of an inner race 84 (e.g., a split inner race) of the bearing 78. An outer surface of the tubular base 82 radially engages (e.g., contacts) an inner surface of the inner race 84. The bearing 78 of FIG. 3 is axially aligned with the spline connection 86 between the second gear 62 and the tower shaft 56.

The bearing 78 as well as the gear system 58 and other engine components are housed within a compartment 88; e.g., a bearing compartment. Fluid (e.g., gas) within this compartment 88 may be at a relatively high pressure. Components subject to such a relatively high fluid pressure may require use of more robust materials and/or designs. Therefore, to isolate the relatively high pressure fluid within the compartment 88 from areas and components (e.g., low pressure seals for the gearbox 50) outside of the compartment 88, the turbine engine 10 is configured with a fluid (e.g., gas) seal assembly 90.

Figure 3:
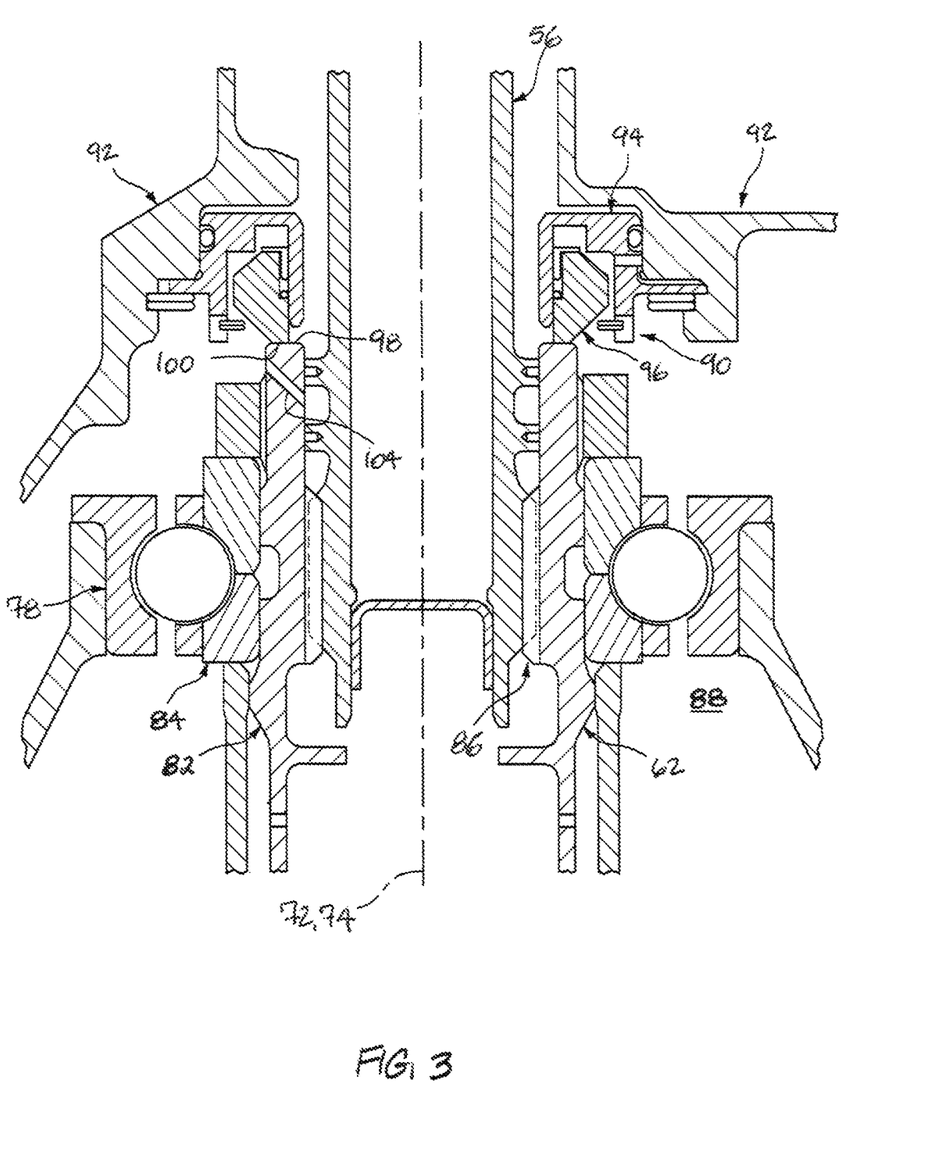
FIG. 3 is a side sectional illustration of a portion of an assembly of the turbine engine of FIG. 1.

The seal assembly 90 of FIG. 3 is configured to at least partially or completely seal an annular gap between a stationary structure 92 (e.g., an internal structure of/for the housing 22) and the second gear 62, which stationary structure 92 circumscribes the tower shaft 56. This seal assembly 90 includes a stationary (e.g., non-rotating) seal support assembly 94 and a stationary (e.g., non-rotating) seal element 96 such as, but not limited to, an annular carbon seal element. This seal element 96 extends circumferentially around the rotational axis 72, 74 and is arranged to circumscribe the tower shaft 56. Thus, the tower shaft 56 projects axially along the rotational axis 74 through a bore of the seal element 96.

The seal support assembly 94 mounts the seal element 96 to the stationary structure 92. The seal support assembly 94 is configured to bias (e.g., push) the seal element 96 axially towards the second gear 62 such that the seal element 96 axially engages (e.g., contacts) the second gear 62. More particularly, the tubular base 82 of the second gear 62 extends axially along the rotational axis 72 to a distal annular end surface 100. A distal annular end surface 100 of the seal element 96, which is axially opposite and parallel with the end surface 98, is biased axially against the end surface 98 to form a sealed interface between the seal element 96 and the second gear 62.

Rubbing friction between the end surfaces 98 and 100 may cause the second gear 62 to heat up during rotation of the second gear 62 relative to the seal element 96. The second gear 62 of FIG. 3 therefore is configured with one or more apertures 104; e.g., lubricant passages and/or slots. These apertures 104 are arranged in a circumferential array about the rotational axis 72, where each of the apertures 104 extends through a sidewall of the tubular base 82 of the second gear 62. Thus, referring to FIG. 4, each of the apertures 104 is adapted to direct lubricant 106 flowing within an intra-component passage 108 into the compartment 88, where the lubricant 106 absorbs heat energy from the second gear 62 through conduction while passing through the apertures 104.

Figure 4:
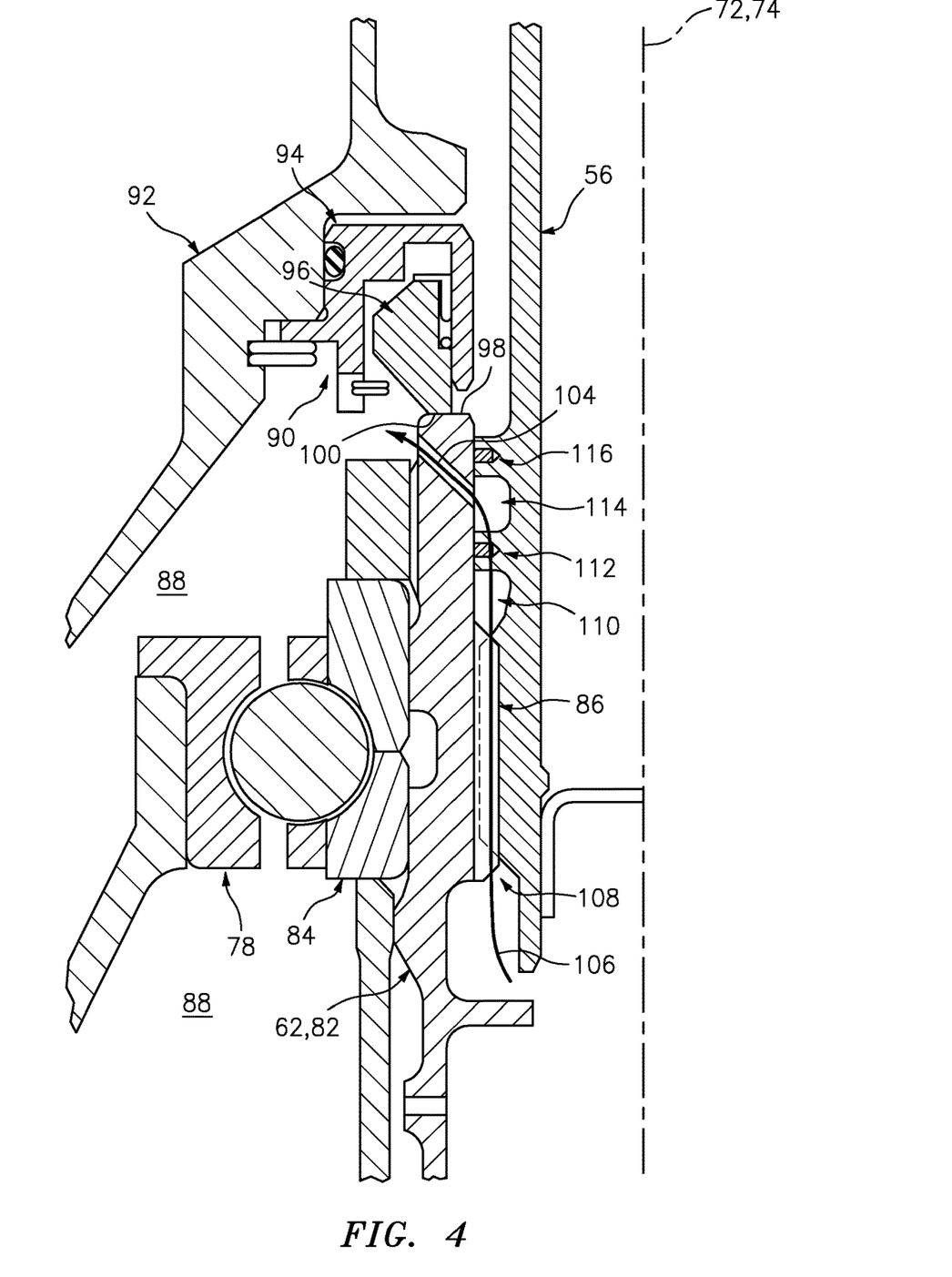
FIG. 4 is an enlarged portion of the turbine engine assembly of FIG. 3.

The intra-component passage 108 of FIG. 4 extends axially through the spline connection 86 between the second gear 62 and the tower shaft 56 and into a first annulus 110 (e.g., an annular channel or cavity or an array of slots), which is axially between the spline connection 86 and a fluid permeable seal assembly 112. The intra-component passage 108 then extends axially across the fluid permeable seal assembly 112 and into a second annulus 114 (e.g., an annular channel or cavity or an array of slots), which is axially between the fluid permeable seal assembly 112 and a fluid impermeable seal assembly 116. This second annulus 114 is fluidly coupled with and, thus, is adapted to feed lubricant 106 into one or more of the apertures 104.

Figure 5:
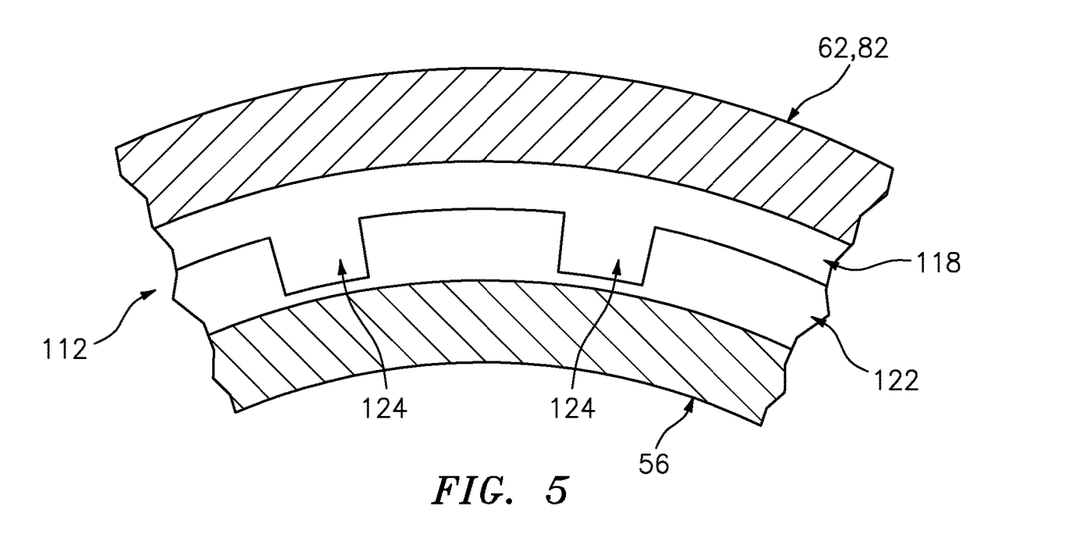
FIG. 5 is a partial illustration of a fluid permeable seal assembly for the turbine engine assembly of FIG. 3.
Figure 6:
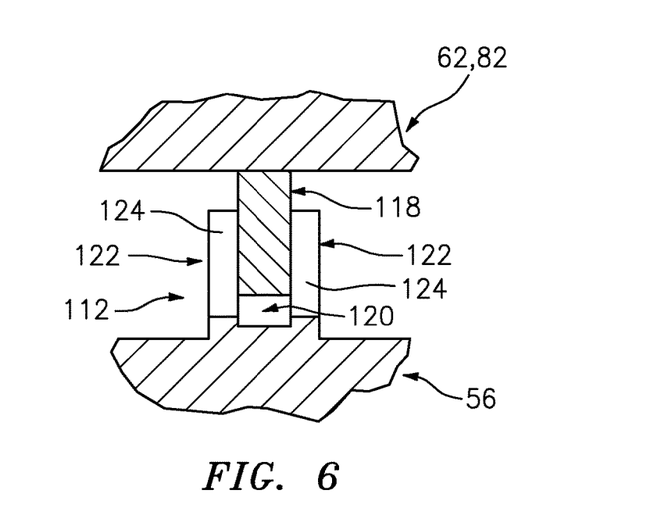
FIG. 6 is a partial side sectional illustration of the fluid permeable seal assembly of FIG. 5.

The term "fluid permeable" may be used to describe a seal assembly configured to allow controlled fluid leakage thereacross. For example, referring to FIGS. 5 and 6, the fluid permeable seal assembly 112 may include a seal ring 118 (e.g., an annular spiral retaining ring) seated in a groove 120 of the tower shaft 56. This groove 120 extends axially between a pair of circumferentially interrupted (e.g., splined or castellated) flanges 122, which flanges 122 project radially out from a tubular sidewall of the tower shaft 56. With such a configuration, a controlled rate of lubricant 106 may flow through the interruptions 124 (e.g., slots) in the flanges 122 and, thus, flow axially across the seal assembly 112.

Figure 7:
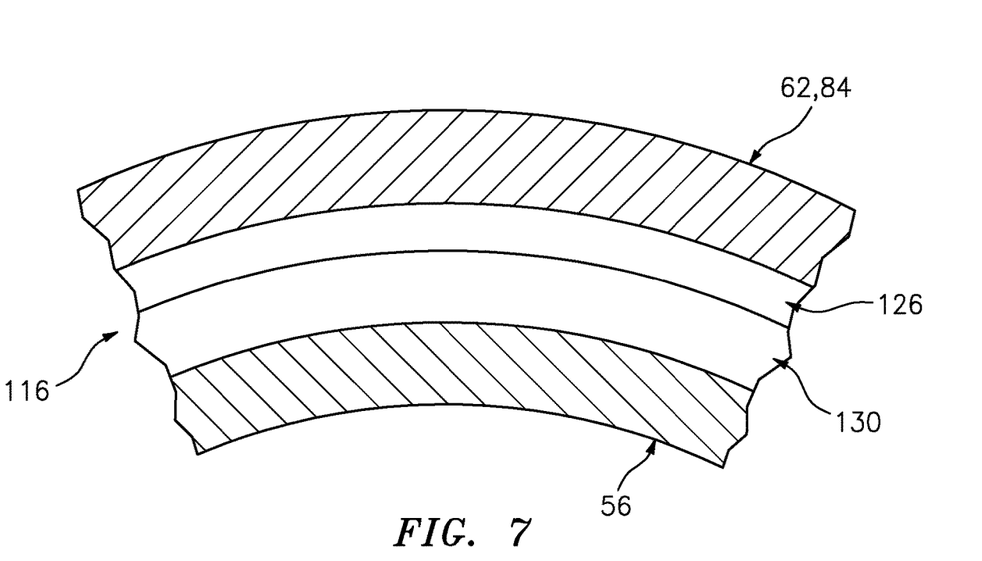
FIG. 7 is a partial illustration of a fluid impermeable seal assembly for the turbine engine assembly of FIG. 3.
Figure 8:
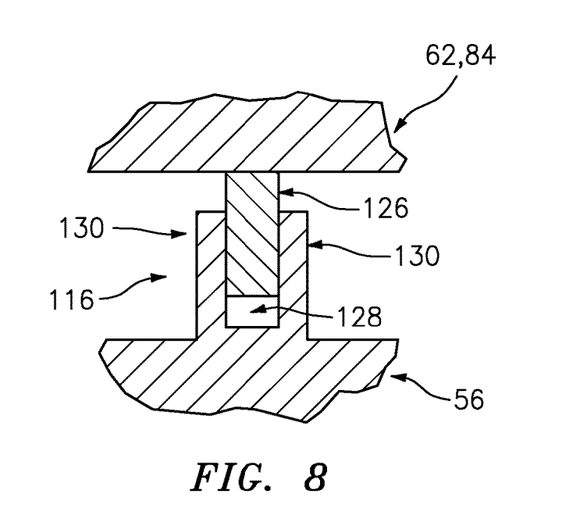
FIG. 8 is a partial side sectional illustration of the fluid impermeable seal assembly of FIG. 7.

The term "fluid impermeable" may be used to describe a seal assembly configured to substantially or completely prevent fluid leakage thereacross. For example, referring to FIGS. 7 and 8, the fluid impermeable seal assembly 116 may include a seal ring 126 (e.g., an annular spiral retaining ring) seated in another groove 128 of the tower shaft 56. This groove 128 extends axially between a pair of circumferentially uninterrupted flanges 130, which flanges 130 project radially out from the tubular sidewall of the tower shaft 56. With such a configuration, the combination of the elements 126 and 130 may substantially (compared to the controlled leakage across the seal assembly) prevent or completely prevent lubricant 106 flow across the seal assembly 116.

Figure 9:
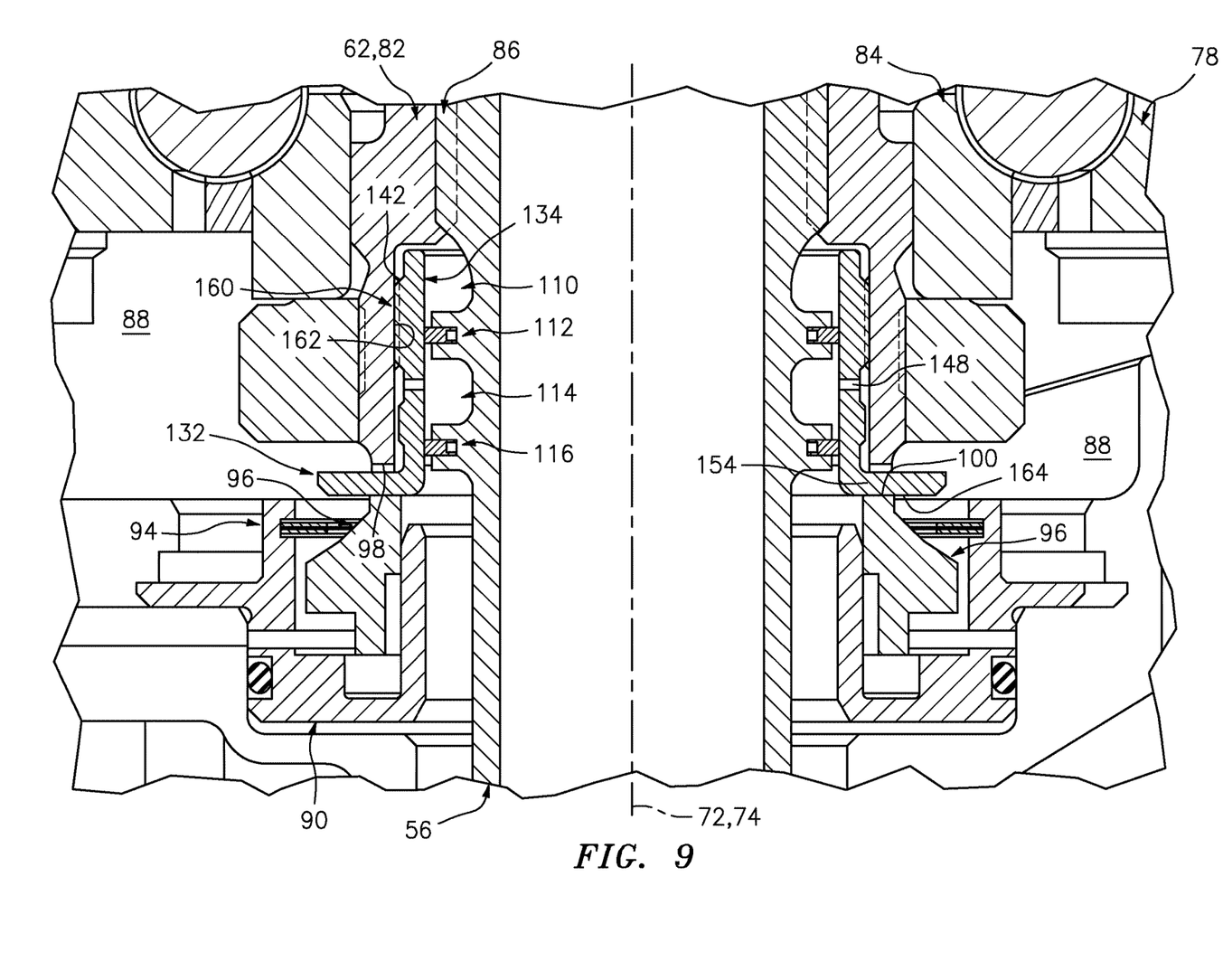
FIG. 9 is a side sectional illustration of a portion of an alternative assembly for the turbine engine of FIG. 1.

Referring to FIG. 9, in some embodiments, the turbine engine 10 may include a replaceable engine component that provides an intermediate body between the seal element 96 and the second gear 62. In the specific embodiment of FIG. 9, the replaceable engine component is configured as a seal runner 132.

Figure 10:
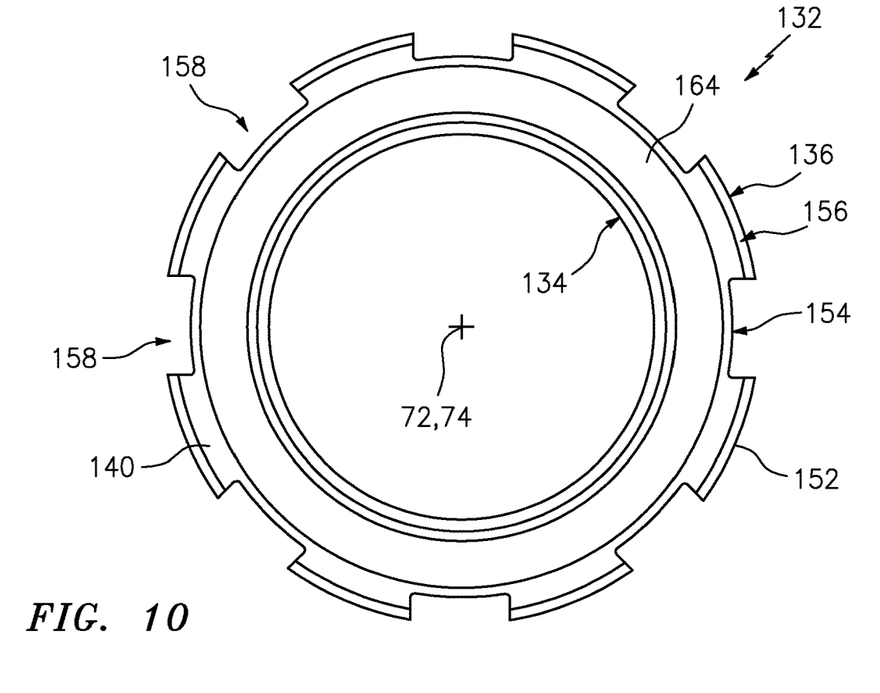
FIG. 10 is an end view illustration of a seal runner for the turbine engine assembly of FIG. 9.
Figure 11:
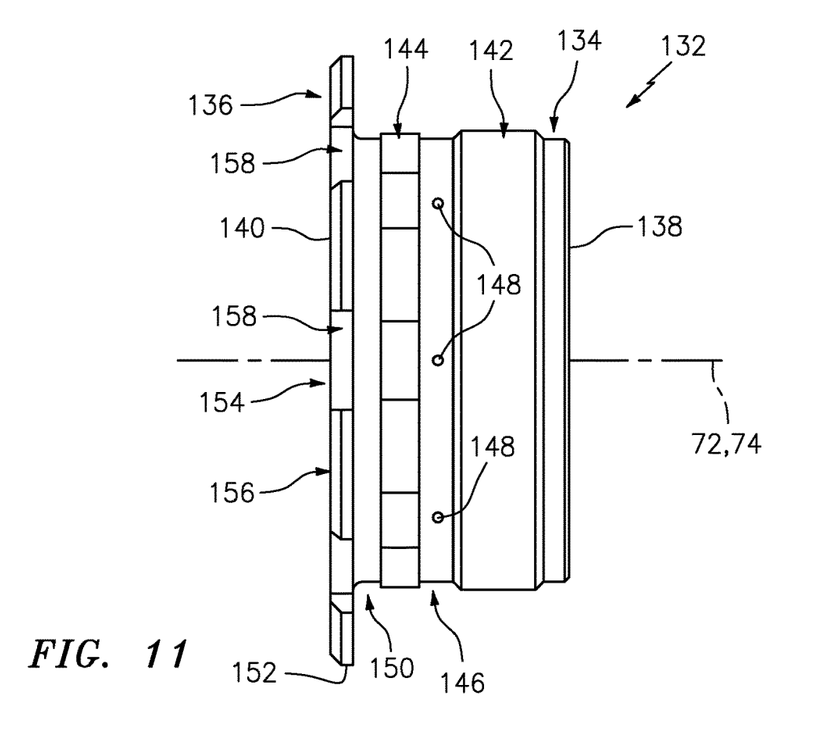
FIG. 11 is a side view illustration of the seal runner of FIG. 10.

The seal runner 132 of FIGS. 10 and 11 includes a tubular base 134 and an annular flange 136, which are formed together as a unitary monolithic full hoop body. The tubular base 134 extends axially along the rotational axis 72, 74 between axially opposed ends 138 and 140 of the seal runner 132. The tubular base 134 includes a threaded portion 142 and a circumferentially interrupted (e.g., castellated) ring portion 144. A first annulus 146 (e.g., an annular channel) is formed axially between the threaded portion 142 and the ring portion 144. This annulus 146 is fluidly coupled with one or more apertures 148 (e.g., lubricant passages), which extend through a tubular sidewall of the tubular base 134. These apertures 148 are arranged in a circumferential array about the rotational axis 72, 74. A second annulus 150 (e.g., an annular channel) is formed axially between the annular flange 136 and the ring portion 144.

The annular flange 136 is located at (e.g., on, adjacent or proximate) the second end 140 of the seal runner 132. The annular flange 136 extends circumferentially about the rotational axis 72, 74. The annular flange 136 projects radially out from the tubular base 134 to a distal end 152. The annular flange 136 of FIGS. 10 and 11 includes a circumferentially uninterrupted inner portion 154 and a circumferentially interrupted outer portion 156 (e.g., a castellated, slotted outer peripheral portion). The inner portion 154 extends radially from the tubular base 134 to the outer portion 156. The outer portion 156 extends radially from the inner portion 154 to the distal end 152. The outer portion 156 is configured with one or more slots 158. Each of these slots 158 extends radially into the annular flange 136 from the distal end 152. Each of the slots 158 extends axially through the annular flange 136. This arrangement of slots 158 may be configured for mating with a tool to aid in the installation and/or removal of the seal runner 132 from the turbine engine 10.

Referring to FIG. 9, the seal runner 132 is disposed in a cavity radially between the second gear 62 and the tower shaft 56. The seal runner 132 is mounted to the second gear 62 by a threaded connection 160 between the tubular bases 82 and 134. More particularly, the threaded portion 142 of the seal runner 132 is mated with (thread into) a threaded portion 162 of the second gear 62. The annular flange 136 may be axially abutted against the distal end surface 98 of the second gear 62, which in the embodiment of FIG. 9 is circumferentially interrupted.

With the installation of the seal runner 132, the seal element 96 is configured to axially engage (e.g., contact) a distal annular end surface 164 of the seal runner 132 and its inner portion 154 and annular flange 136 in a similar manner as described above with respect to the engagement between the components 62 and 96 (see FIG. 3).

Figure 12:
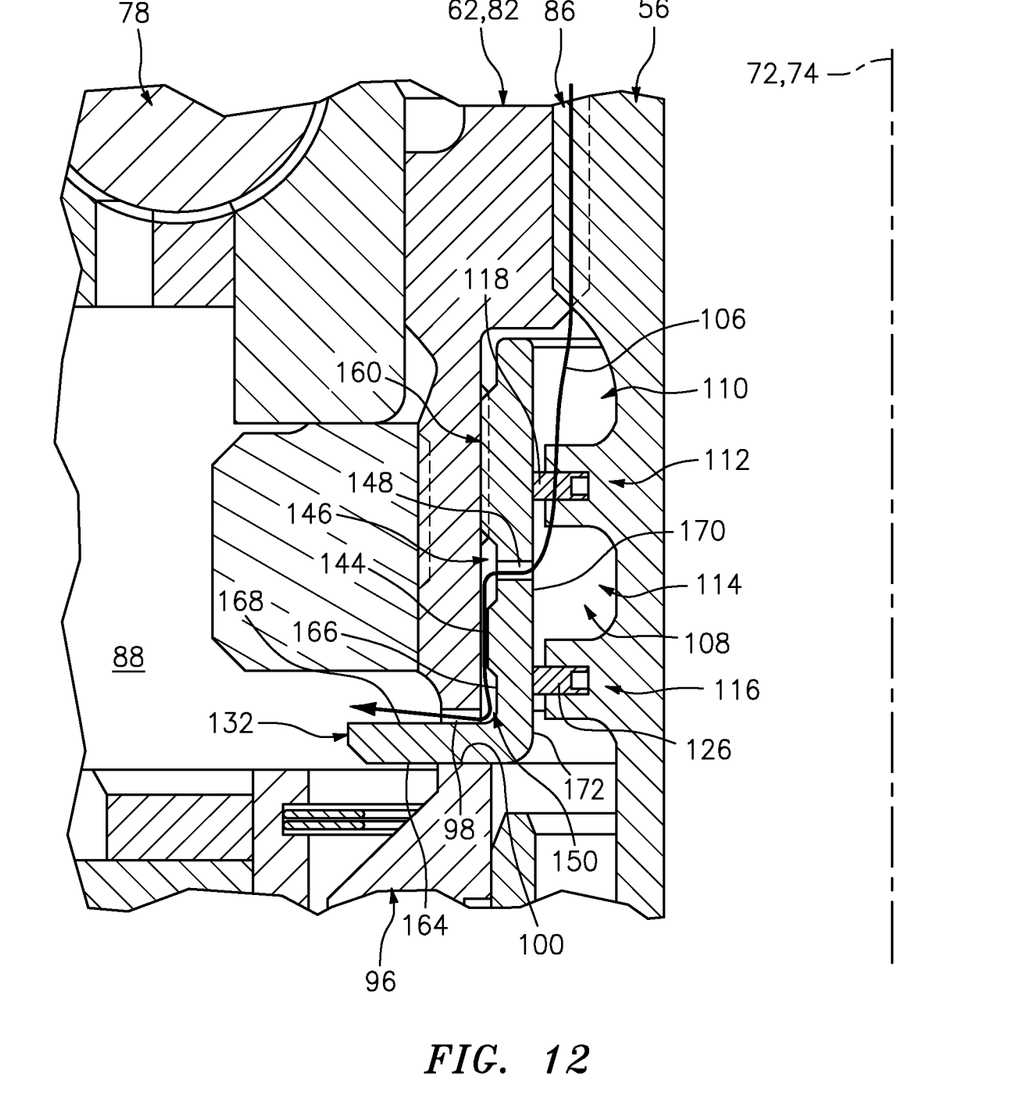
FIG. 12 is an enlarged portion of the turbine engine assembly of FIG. 9.

Rubbing friction between the end surfaces 100 and 164 may cause the seal runner 132 to heat up during rotation of the seal runner 132 relative to the seal element 96. The seal runner 132 of FIG. 9 therefore is configured with the one or more apertures 148. Referring to FIG. 12, the apertures 148 are operable to direct lubricant 106 flowing within the intra-component passage 108 into the compartment 88, where the lubricant 106 absorbs heat energy from the seal runner 132 through conduction while passing through the apertures 148 and along the axially and radially extending surfaces 166 and 168 of the seal runner 132.

The intra-component passage 108 of FIG. 12 extends axially through the spline connection 86 between the second gear 62 and the tower shaft 56 and into the first annulus 110. The intra-component passage 108 then extends axially across the fluid permeable seal assembly 112 and into the second annulus 114. This second annulus 114 is fluidly coupled with and, thus, is adapted to feed lubricant 106 into one or more of the apertures 148. The lubricant 106 then passes sequentially through the first annulus 146 and slots in the ring portion 144 and into the second annulus 150. To enable the lubricant 106 to flow out of the second annulus 150 and into the compartment 88, the distal end surface 98 of the second gear 62 in the embodiment of FIG. 9 (not in the embodiment of FIG. 3) may be circumferentially interrupted by one or more slots; e.g., a distal end of the second gear 62 may be castellated.

In the embodiment of FIG. 12, the seal rings 118 and 126 of the seal assemblies 112 and 116 are configured to radially engage (e.g., contact) an inner surface 170 of the seal runner 132 rather than an inner surface of the second gear 62 as shown in FIG. 4. In some embodiments, the inner surface 170 of the seal runner 132 may be recessed radially outward from an inner lip 172 of the seal runner 132. With such a configuration, the lip 172 may function as a retainer for the tower shaft 56 during installation.

The assemblies described above may be included in various turbine engines other than the one described above. The assemblies of FIGS. 3 and 9, for example, may be included in a geared turbine engine where a gear train connects one or more shafts to one or more rotors in a fan section, a compressor section and/or any other engine section. Alternatively, the assemblies of FIGS. 3 and 9 may be included in a turbine engine configured without a gear train. The assemblies of FIGS. 3 and 9 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a tower shaft rotatable about an axis;
an engine component rotatable with the tower shaft about the axis, the engine component comprising an end surface, and the engine component extending axially along the axis to the end surface;
a seal assembly comprising a carbon seal element, the carbon seal element circumscribing the tower shaft and axially engaging the end surface;
a fluid permeable seal assembly configured radially between the tower shaft and the engine component; and
a fluid impermeable seal assembly configured radially between the tower shaft and the engine component, the fluid impermeable seal assembly located axially between the fluid permeable seal assembly and the end surface;
wherein an aperture extends through a tubular sidewall of the engine component and is fluidly coupled with a channel that extends axially between the fluid permeable seal assembly and the fluid impermeable seal assembly.

2. The assembly of claim 1, further comprising:
a rotating assembly including a first bladed rotor, a second bladed rotor and an engine shaft that connects the first bladed rotor to the second bladed rotor, the engine shaft rotatable about a centerline that is angularly offset from the axis; and a coupling assembly coupling the tower shaft to the rotating assembly.

3. The assembly of claim 2, wherein the coupling assembly comprises the engine component.

4. The assembly of claim 2, wherein the engine component is mounted to a component of the coupling assembly.

5. The assembly of claim 1, wherein the tower shaft projects axially into a bore of the engine component, and the engine component is mounted to the tower shaft.

6. The assembly of claim 1, wherein
the fluid permeable seal assembly comprises a first seal ring seated in a first groove extending axially between a pair of circumferentially interrupted flanges projecting out from a tubular sidewall of the tower shaft; and
the fluid impermeable seal assembly comprises a second seal ring seated in a second groove extending axially between a pair of circumferentially uninterrupted flanges projecting out from the tubular sidewall of the tower shaft.

7. The assembly of claim 1, wherein the engine component comprises a pinion gear mounted to the tower shaft.

8. The assembly of claim 7, wherein the pinion gear is attached to the tower shaft by a spline connection between the tower shaft and the pinion gear.

9. The assembly of claim 8, further comprising a bearing, the pinion gear projecting through and radially engaging an inner race of the bearing, and the bearing axially aligned with the spline connection along the axis.

10. The assembly of claim 1, further comprising a second engine component mounted to the tower shaft, wherein the engine component is mounted to the second engine component, and the tower shaft projects axially through a bore of the engine component.

11. The assembly of claim 10, wherein
the fluid permeable seal assembly comprises a first seal ring seated in a first groove extending axially between a pair of circumferentially interrupted flanges projecting out from a tubular sidewall of the tower shaft; and
the fluid impermeable seal assembly comprises a second seal ring seated in a second groove extending axially between a pair of circumferentially uninterrupted flanges projecting out from the tubular sidewall of the tower shaft.

12. The assembly of claim 10, wherein the second engine component comprises a pinion gear, and the engine component comprises a seal runner.

13. An assembly for a turbine engine, comprising:
a tower shaft rotatable about an axis;
an engine component rotatable with the tower shaft about the axis, the engine component comprising an end surface, and the engine component extending axially along the axis to the end surface;
a seal assembly comprising a carbon seal element, the carbon seal element circumscribing the tower shaft and axially engaging the end surface; and
a second engine component mounted to the tower shaft, the engine component mounted to the second engine component, and the tower shaft projecting axially through a bore of the engine component;
wherein the second engine component comprises a pinion gear, and the engine component comprises a seal runner;
wherein the pinion gear is attached to the tower shaft by a spline connection between the tower shaft and the pinion gear; and
wherein the seal runner is attached to the pinion gear by a threaded connection between the pinion gear and the seal runner.

14. The assembly of claim 13, further comprising a bearing, the pinion gear projecting through and radially engaging an inner race of the bearing, and the bearing axially aligned with the spline connection along the axis.

15. The assembly of claim 1, wherein
the engine component comprises a tubular base and an annular flange;
the tubular base extends axially along the axis;
the annular flange projects radially out from the tubular base and comprises the end surface.

16. The assembly of claim 15, wherein
an outer peripheral portion of the annular flange is circumferentially interrupted; and/or
the tubular base comprises a circumferentially interrupted ring portion.

* * * * *